United States Patent
Lin et al.

(10) Patent No.: US 11,442,351 B2
(45) Date of Patent: Sep. 13, 2022

(54) ILLUMINATION SYSTEM AND PROJECTION APPARATUS FOR ENHANCING UNIFORMITY OF ILLUMINATION LIGHT BEAMS

(71) Applicant: Coretronic Corporation, Hsin-Chu (TW)

(72) Inventors: Chun-Wei Lin, Hsin-Chu (TW); Kun-Chen Hsu, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 17/131,793

(22) Filed: Dec. 23, 2020

(65) Prior Publication Data

US 2021/0286248 A1 Sep. 16, 2021

(30) Foreign Application Priority Data

Mar. 12, 2020 (CN) .......................... 202010170060.3

(51) Int. Cl.
  *G03B 21/20* (2006.01)
  *G02B 27/14* (2006.01)
  *G02B 27/10* (2006.01)

(52) U.S. Cl.
  CPC ....... *G03B 21/2066* (2013.01); *G02B 27/144* (2013.01); *G03B 21/208* (2013.01); *G02B 27/1046* (2013.01)

(58) Field of Classification Search
  CPC  G03B 21/2066; G03B 21/208; G02B 27/144; G02B 27/1046
  See application file for complete search history.

(56) References Cited

U.S. PATENT DOCUMENTS 7,980,706 B2   7/2011  Wang
9,004,699 B2 * 4/2015  Huang ................... G03B 33/06
                                                         353/94
(Continued)

FOREIGN PATENT DOCUMENTS

CN      1467534      1/2004
CN      1624575      6/2005
(Continued)

OTHER PUBLICATIONS

"Office Action of US Related Application, U.S. Appl. No. 17/192,844", dated Oct. 27, 2021, p. 1-p. 19.
(Continued)

*Primary Examiner* — Bao-Luan Q Le
(74) *Attorney, Agent, or Firm* — JCIPRNET

(57) ABSTRACT

An illumination system including a first light source device, a light guide device, a light splitting device, and a light converging element is provided. The first light source device provides first, second, and third light beams and a first compensation light beam. The light guide device reflects the first, second, and third light beams and the first compensation light beam. The light splitting device includes a first half reflecting element configured to reflect a part of a light beam and being pervious to another part of the light beam. The light converging element receives first and second combined light beams formed by the first, second, and third light beams and the first compensation light beam, where distances between light spots formed on the light converging element by the first and second combined light beams and a central axis of the light converging element are identical and greater than zero.

26 Claims, 15 Drawing Sheets

(56) References Cited

U.S. PATENT DOCUMENTS

| | | | |
|---|---|---|---|
| 2004/0263500 A1* | 12/2004 | Sakata | H04N 9/315 345/204 |
| 2005/0117337 A1* | 6/2005 | Ishii | G03B 21/2073 362/241 |
| 2008/0094577 A1 | 4/2008 | Krijn et al. | |
| 2008/0192205 A1 | 8/2008 | De Vaan | |
| 2009/0262309 A1* | 10/2009 | Yamauchi | G02B 27/149 353/37 |
| 2011/0007279 A1 | 1/2011 | Silverstein et al. | |
| 2011/0096298 A1* | 4/2011 | Huang | G03B 21/208 353/31 |
| 2011/0096299 A1* | 4/2011 | Huang | G03B 21/2033 353/31 |
| 2011/0317131 A1 | 12/2011 | Miyazaki | |
| 2012/0133904 A1 | 5/2012 | Akiyama | |
| 2012/0188469 A1* | 7/2012 | Fukui | G03B 21/2073 349/5 |
| 2013/0169937 A1 | 7/2013 | Ouderkirk et al. | |
| 2013/0300948 A1* | 11/2013 | Jannard | H04N 9/3164 348/756 |
| 2014/0002514 A1* | 1/2014 | Richards | G03B 21/005 345/691 |
| 2014/0333900 A1* | 11/2014 | Aboshi | G03B 21/2033 353/38 |
| 2014/0333902 A1* | 11/2014 | Aboshi | G02B 27/1033 353/38 |
| 2014/0354956 A1* | 12/2014 | Yamada | H04N 9/3167 353/20 |
| 2015/0124227 A1* | 5/2015 | Kobayashi | G02B 27/0101 353/38 |
| 2015/0350588 A1* | 12/2015 | Lim | G09G 5/026 348/745 |
| 2015/0373312 A1* | 12/2015 | Miura | G02B 27/283 349/9 |
| 2016/0131315 A1 | 5/2016 | Zhang et al. | |
| 2016/0139419 A1 | 5/2016 | Huang | |
| 2016/0211652 A1* | 7/2016 | Fischer | G02B 27/1006 |
| 2016/0286180 A1 | 9/2016 | Otani et al. | |
| 2017/0176845 A1* | 6/2017 | Ogino | F21V 7/05 |
| 2018/0231882 A1* | 8/2018 | Miura | G03B 21/2013 |
| 2019/0155041 A1 | 5/2019 | Jurik et al. | |
| 2019/0310539 A1* | 10/2019 | Yamagishi | G03B 21/2066 |
| 2020/0004121 A1 | 1/2020 | Shimamura | |
| 2021/0191250 A1* | 6/2021 | Kurita | G03B 21/2013 |

FOREIGN PATENT DOCUMENTS

| | | |
|---|---|---|
| CN | 101044430 | 9/2007 |
| CN | 102520571 | 6/2012 |
| CN | 102621791 | 8/2012 |
| CN | 102854622 | 1/2013 |
| CN | 202710914 | 1/2013 |
| CN | 202886821 | 4/2013 |
| CN | 104791717 | 7/2015 |
| CN | 204595412 | 8/2015 |
| CN | 105190165 | 12/2015 |
| CN | 104020632 | 8/2016 |
| CN | 106125482 | 11/2016 |
| CN | 106997142 | 8/2017 |
| CN | 107436528 | 12/2017 |
| CN | 107870444 | 4/2018 |
| CN | 107885021 | 4/2018 |
| CN | 108225182 | 6/2018 |
| CN | 108614385 | 10/2018 |
| CN | 208060924 | 11/2018 |
| CN | 109557750 | 4/2019 |
| CN | 209265161 | 8/2019 |
| CN | 110275375 | 9/2019 |
| CN | 210038427 | 2/2020 |
| CN | 211375295 | 8/2020 |
| CN | 211403092 | 9/2020 |
| CN | 113589635 | 11/2021 |
| EP | 3521749 | 8/2019 |
| JP | H09510026 | 10/1997 |
| JP | 2011242537 | 12/2011 |
| JP | 2012533087 | 12/2012 |
| KR | 20150097098 | 8/2015 |
| TW | 201516555 | 5/2015 |
| TW | 201541181 | 11/2015 |
| WO | 2011146267 | 11/2011 |
| WO | 2018196195 | 11/2018 |

OTHER PUBLICATIONS

"Search Report of Europe Counterpart Application", dated Jun. 23, 2021, p. 1-p. 9.

"Search Report of Europe Related Application, application No. 21169200.9", dated Jul. 23, 2021, p. 1-p. 7.

"Office Action of US Related Application, U.S. Appl. No. 17/232,136", dated Nov. 10, 2021, p. 1-p. 22.

"Office Action of China Counterpart Application", dated Jan. 28, 2022, p. 1-p. 9.

"Office Action of China Related Application, Application No. 202010173654.X", dated Jan. 28, 2022, p. 1-p. 10.

"Office Action of China Related Application, Application No. 202010361226.X", dated Mar. 28, 2022, p. 1-p. 10.

\* cited by examiner

ILLUMINATION SYSTEM AND PROJECTION APPARATUS FOR ENHANCING UNIFORMITY OF ILLUMINATION LIGHT BEAMS

CROSS-REFERENCE TO RELATED APPLICATION

This application claims the priority benefit of China application serial no. 202010170060.3, filed on Mar. 12, 2020. The entirety of the above-mentioned patent application is hereby incorporated by reference herein and made a part of this specification.

BACKGROUND

Technical Field

The invention relates to an optical system and a display apparatus, and particularly relates to an illumination system and a projection apparatus.

Description of Related Art

Projection apparatuses are display apparatuses used to generate large-size images and have been continuously improved along with evolution and innovation of technology. An imaging principle of a projection apparatus is to convert an illumination light beam generated by an illumination system into an image light beam through a light valve, and then project the image light beam onto a projection target (such as a screen or a wall) through a projection lens to form a projection image. In an existing pure laser projector, in order to achieve sufficient uniformity of color, optical paths are generally designed to guide laser light beams provided by red, green and blue lasers of the three primary colors to a same optical path for entering a light uniforming element, and then the laser light beams are modulated into the image light beam by a light modulation element.

The existing red, green, and blue lasers mainly adopt single-color laser modules, which are three groups of red, green, and blue laser modules. Therefore, in view of an optical design, it is relatively simple to guide light of various colors to the same optical path, and it is only required to configure several light splitting and combining elements in exit directions of the laser light beams, and the laser light beams may be transmitted to subsequent optical elements in a complete overlapping manner. However, the use of three groups of laser modules occupies much space. In order to reduce a volume of a whole optical engine, a recent development trend is to use multi-color laser modules. However, a problem of poor color uniformity may occur.

The information disclosed in this BACKGROUND section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention were acknowledged by a person of ordinary skill in the art.

SUMMARY

The invention is directed to a projection apparatus and an illumination system, which are capable of improving uniformity of transmitted light beams.

Other objects and advantages of the invention may be further illustrated by the technical features broadly embodied and described as follows.

In order to achieve one or a portion of or all of the objects or other objects, an embodiment of the invention provides an illumination system including a first light source device, a light guide device, a light splitting device, and a light converging element. The first light source device is configured to provide a first light beam, a second light beam, a third light beam, and a first compensation light beam. The light guide device is configured to reflect the first light beam, the second light beam, the third light beam, and the first compensation light beam. The light splitting device includes a first half reflecting element, where the first half reflecting element is configured to reflect a part of a light beam and is pervious to another part of the light beam. The light converging element is configured to receive a first combined light beam and a second combined light beam formed by the first light beam, the second light beam, the third light beam, and the first compensation light beam, where distances between light spots formed on the light converging element by the first combined light beam and the second combined light beam and a central axis of the light converging element are both identical and greater than zero.

In order to achieve one or a portion of or all of the objects or other objects, an embodiment of the invention provides a projection apparatus including an illumination system, at least one light valve, and a projection lens. The illumination system is configured to provide an illumination light beam. The illumination system includes a first light source device, a light guide device, a light splitting device, and a light converging element. The first light source device is configured to provide a first light beam, a second light beam, a third light beam, and a first compensation light beam. The light guide device is configured to reflect the first light beam, the second light beam, the third light beam, and the first compensation light beam. The light splitting device includes a first half reflecting element, where the first half reflecting element is configured to reflect a part of a light beam and is pervious to another part of the light beam. The light converging element is configured to receive a first combined light beam and a second combined light beam formed by the first light beam, the second light beam, the third light beam, and the first compensation light beam, where distances between light spots formed on the light converging element by the first combined light beam and the second combined light beam and a central axis of the light converging element are both identical and greater than zero. The light valve is disposed on a transmission path of the illumination light beam, and is configured to convert the illumination light beam into an image light beam. The projection lens is disposed on a transmission path of the image light beam, and is configured to project the image light beam out of the projection apparatus.

Based on the above, the embodiments of the invention have at least one of following advantages or effects. In the illumination system and the projection apparatus of the invention, the plurality of light beams provided by the first light source device are transmitted to the light splitting device through configuration of different optical elements in the light guide device, and the light beams pass through the light splitting device to generate the first combined light beam and the second combined light beam. Moreover, the distances between the light spots formed on the light converging element by the first combined light beam and the second combined light beam and the central axis of the light converging element are both identical and greater than zero.

In this way, uniformity of the light beam transmitted to a light uniforming element is improved, such that a projection image of the projection apparatus exhibits a good optical effect.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
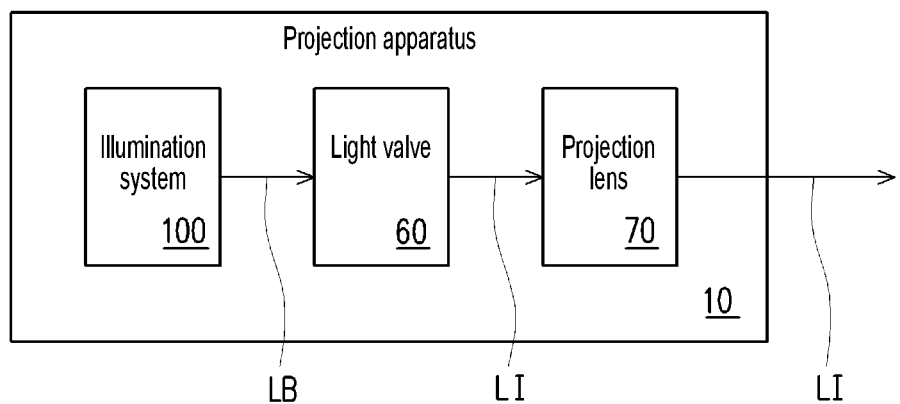
FIG. 1 is a schematic diagram of a projection apparatus according to an embodiment of the invention.

FIG. 1 is a schematic diagram of a projection apparatus according to an embodiment of the invention. Referring to FIG. 1, the embodiment provides a projection apparatus 10 including an illumination system 100, at least one light valve 60, and a projection lens 70. The illumination system 100 is configured to provide an illumination light beam LB. The at least one light valve 60 is disposed on a transmission path of the illumination light beam LB, and is configured to convert the illumination light beam LB into an image light beam LI. The projection lens 70 is disposed on a transmission path of the image light beam LI and is configured to project the image light beam LI out of the projection apparatus 10 to reach a projection target (not shown), which is, for example, a screen or a wall surface.

The light valve 60 is, for example, a reflective light modulator, such as a liquid crystal on silicon panel (LCoS panel), a digital micro-mirror device (DMD), etc. In some embodiments, the light valve 60 may also be a transmissive light modulator, such as a transparent liquid crystal panel, an electro-optical modulator, a magneto-optic modulator, an acousto-optic modulator (AOM), etc. The pattern and type of the light valve 60 are not limited by the invention. Regarding the method that the light valve 60 converts the illumination light beam LB into the image light beam LI, enough instructions, recommendations and implementation description for detailed steps and implementation of the method may be learned from ordinary knowledge of the related technical field, and details thereof are not repeated. In the embodiment, the number of the at least one light valve 60 is one, for example, the projection apparatus 10 adopts a single DMD, but in other embodiments, the number of the at least one light valve 60 may be plural, which is not limited by the invention.

The projection lens 70 is, for example, a combination of one or a plurality of optical lenses with refractive powers, for example, various combinations of non-planar lenses such as a biconcave lens, a biconvex lens, a concavo-convex lens, a convexo-concave lens, a plano-convex lens, a plano-concave lens, etc. In an embodiment, the projection lens 70 may further include a planar optical lens, which projects the image light beam LI coming from the light valve 60 to the projection target in a reflective manner. The pattern and type of the projection lens 70 are not limited by the invention.

Figure 2:
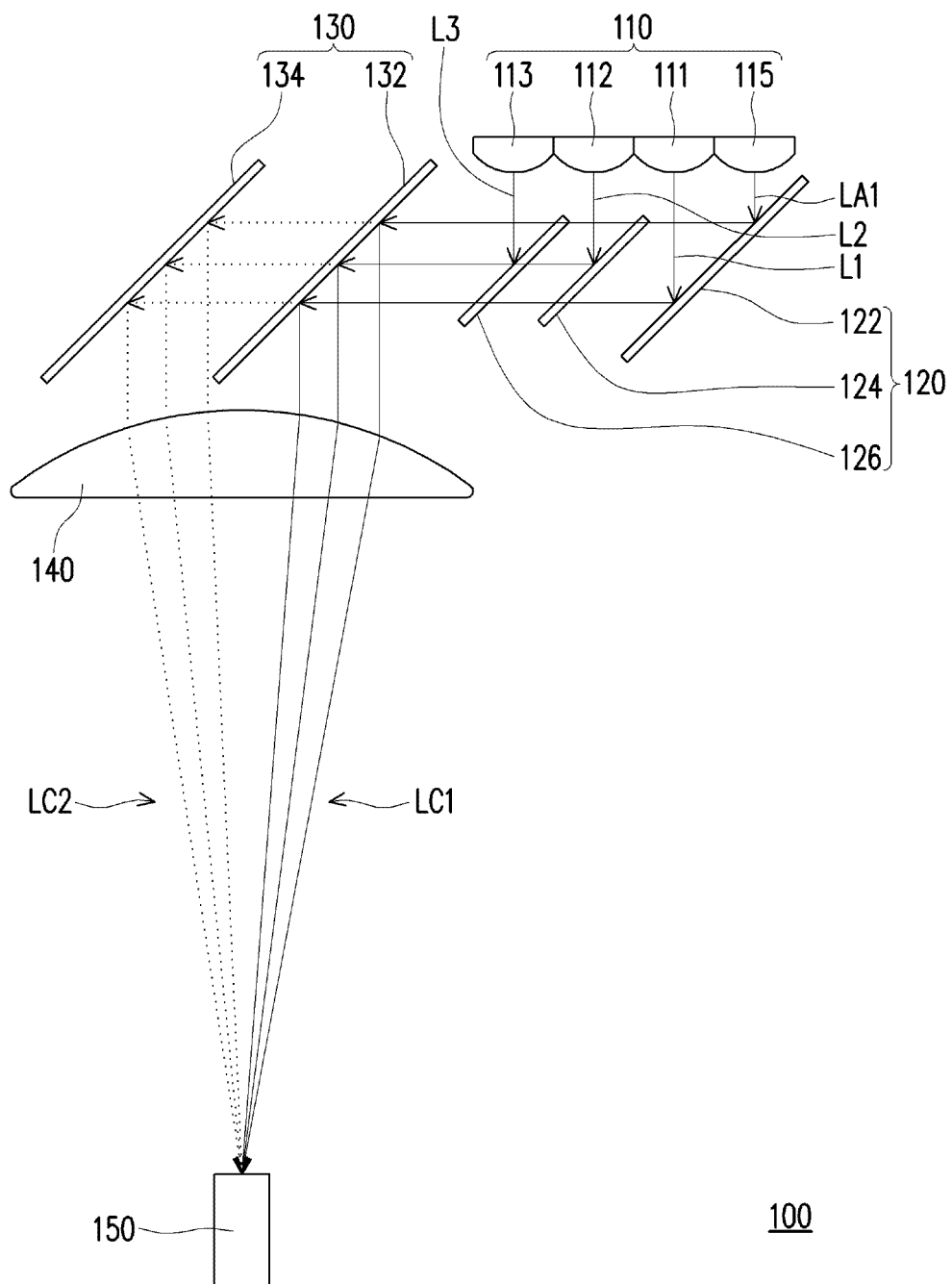
FIG. 2 is a schematic diagram of an illumination system according to an embodiment of the invention.

FIG. 2 is a schematic diagram of an illumination system according to an embodiment of the invention. Referring to FIG. 2, the illumination system 100 shown in FIG. 2 may be at least applied to the projection apparatus 10 of FIG. 1. In the embodiment, the illumination system 100 includes a first light source device 110, a light guide device 120, a light splitting device 130, and a light converging element 140. To be specific, the illumination system 100 of the embodiment further includes a light uniforming element 150. In the embodiment, light beams emitted by the first light source device 110 are transmitted to the light splitting device 130 through the light guide device 120, and through a light splitting function of the light splitting device 130, the light beams are transmitted to the light converging element 140, and then the light beams pass through the light converging element 140 and are transmitted to the light uniforming element 150.

The first light source device 110 is configured to provide a first light beam L1, a second light beam L2, a third light beam L3, and a first compensation light beam LA1. To be specific, in the embodiment, the first light source device 110 includes a first laser source 111, a second laser source 112, a third laser source 113 and a first compensation laser source 115, where the first laser source 111 is configured to provide the first light beam L1, the second laser source 112 is configured to provide the second light beam L2, the third laser source 113 is configured to provide the third light beam L3, and the first compensation laser source 115 is configured to provide the first compensation light beam LA1. In the embodiment, the first laser source 111 is a red laser diode, the second laser source 112 is a blue laser diode, the third laser source 113 is a green laser diode, and the first compensation laser source 115 is a red laser diode, but the invention is not limited thereto. Therefore, the first light beam L1, the second light beam L2, the third light beam L3, and the first compensation light beam LA1 are respectively red light, blue light, green light, and red light. Main wavelengths of the first light beam L1 and the first compensation light beam LA1 may be similar or the same. In an embodiment, positions of the first laser source 111 and the first compensation laser source 115 in the first light source device 110 may be exchanged, which is not limited by the invention.

The light guide device 120 is configured to reflect the first light beam L1, the second light beam L2, the third light beam L3, and the first compensation light beam LA1. To be specific, in the embodiment, the light guide device 120 includes a first reflecting element 122, a first light splitting element 124 and a second light splitting element 126. The first reflecting element 122 is configured to reflect the first light beam L1 and the first compensation light beam LA1. The first light splitting element 124 is configured to reflect the second light beam L2 and is pervious to the first light beam L1 and the first compensation light beam LA1. The second light splitting element 126 is configured to reflect the third light beam L3 and is pervious to the first light beam L1, the first compensation light beam LA1 and the second light beam L2. Light splitting element (Dichroic mirror) reflects light beams of a specific wavelength range and is pervious light beams of another wavelength range.

In other words, in the embodiment, the first reflecting element 122 is, for example, a mirror with red reflect (MR) or a general mirror, the first light splitting element 124 is, for example, a dichroic mirror with blue reflect (DMB), and the second light splitting element 126 is, for example, a dichroic mirror with green reflect (DMG). Therefore, the first light beam L1 and the first compensation light beam LA1 are reflected by the first reflecting element 122 to sequentially pass through the first light splitting element 124 and the second light splitting element 126. The second light beam L2 is reflected by the first light splitting element 124 to pass through the second light splitting element 126. The third light beam L3 is reflected by the second light splitting element 126.

The light splitting device 130 is configured to split light and transmit the light beams to the light converging element 140. To be specific, the light splitting device 130 includes a first half reflecting element 132 and a second reflecting element 134. The first half reflecting element 132 is disposed between the light guide device 120 and the second reflecting element 134. The first half reflecting element 132 is configured to reflect a part of the second light beam L2 and a part of the third light beam L3 and is pervious to another part of the second light beam L2 and another part of the third light beam L3. In the embodiment, the first half reflecting element 132 is further configured to reflect a part of the first light beam L1 and a part of the first compensation light beam LA1 and is pervious to another part of the first light beam L1 and another part of the first compensation light beam LA1. For example, in the embodiment, the first half reflecting element 132 is, for example, a half mirror (HM), which is pervious to 50% of the first light beam L1, the second light beam L2, the third light beam L3, and the first compensation light beam LA1 and reflects the other 50% of the first light beam L1, the second light beam L2, the third light beam L3 and the first compensation light beam LA1. The second reflecting element 134 is, for example, a mirror, and is configured to reflect the first light beam L1, the second light beam L2, the third light beam L3, and the first compensation light beam LA1 passing through the first half reflecting element 132.

Figure 3:
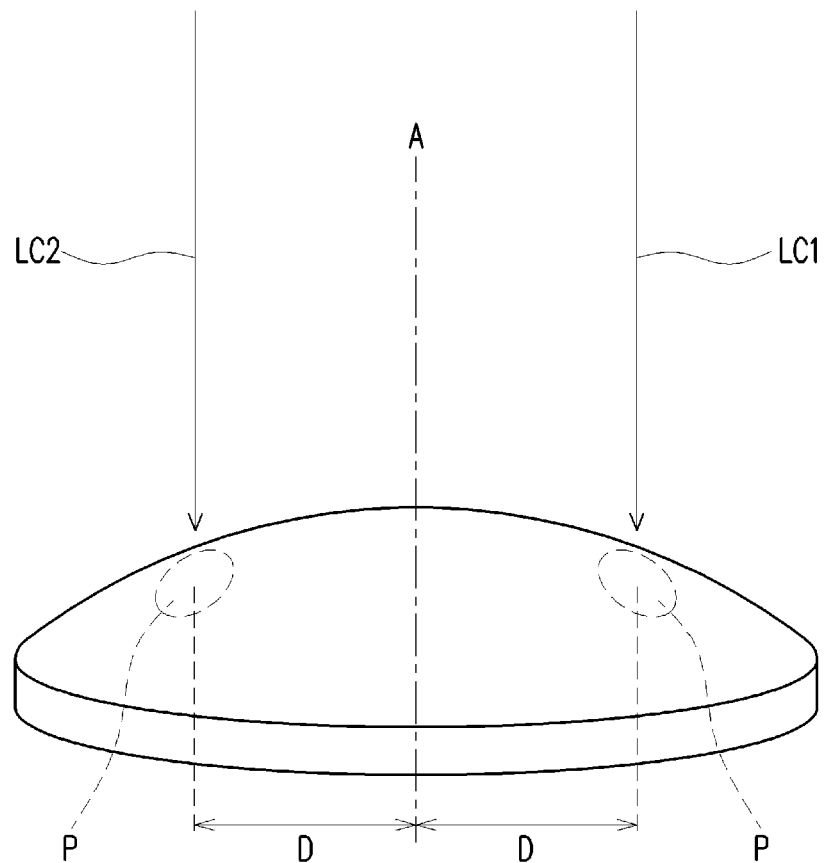
FIG. 3 is a schematic diagram of a light converging element in an illumination system of FIG. 1 receiving light beams.

FIG. 3 is a schematic diagram of the light converging element in the illumination system of FIG. 1 receiving light beams. Referring to FIG. 2 and FIG. 3 together, the light converging element 140 is configured to receive a first combined light beam LC1 and a second combined light beam LC2 formed by the first light beam L1, the second light beam L2, the third light beam L3, and the first compensation light beam LA1 coming from the light guide device 120 or the light splitting device 130. In detail, 50% of the first light beam L1, the second light beam L2, the third light beam L3, and the first compensation light beam LA1 are reflected by the first half reflecting element 132 to form the first combined light beam LC1, and the other 50% of the first light beam L1, the second light beam L2, the third light beam L3, and the first compensation light beam LA1 are reflected by the second reflecting element 134 to form the second combined light beam LC2. Distances D between light spots P formed on the light converging element 140 by the first combined light beam LC1 and the second combined light beam LC2 and a central axis A of the light converging element 140 are both identical and greater than zero. When positions of the first laser source 111 and the first compensation laser source 115 are exchanged, the same first combined light beam LC1 and the second combined light beam LC2 may also be formed. In other words, position exchange of the first laser source 111 and the first compensation laser source 115 may also achieve the same effect. The light converging element 140 is, for example, a combination of one or a plurality of optical lenses with refractive powers, for example, various combinations of non-planar lenses such as a biconcave lens, a biconvex lens, a concavo-convex lens, a convexo-concave lens, a plano-convex lens, a plano-concave lens, etc., but the invention is not limited thereto.

The light uniforming element 150 is disposed on transmission paths of the first combined light beam LC1 and the second combined light beam LC2. The light uniforming element 150 is disposed on a transmission path of a light beam, and is configured to adjust a light spot shape of the light beam and uniformity of the light beam, such that the light spot shape of the light beam may match a shape (for example, a rectangle) of a working area of the light valve 60 (shown in FIG. 1), and everywhere of the light spot has a uniform or closed light intensity, so as to uniform the light intensity of the light beam. In the embodiment, the light uniforming element 150 is, for example, a light integration rod, but in other embodiments, the light uniforming element 150 may also be other suitable types of optical elements, such as a lens array (a fly eye lens array), but the invention is not limited thereto. In the embodiment, the light uniforming element 150 is configured to transform the first combined light beam LC1 and the second combined light beam LC2 into the illumination light beam LB (shown in FIG. 1).

Therefore, in the illumination system 100 of the embodiment, by configuring the light guide device 120 and the light splitting device 130, a plurality of the light beams provided by the first light source device 110 are respectively formed into the first combined light beam LC1 and the second combined light beam LC2 and are transmitted to pass through the light converging element 140 in an off-axis manner, so as to improve uniformity of the light beams transmitted to the light uniforming element 150. Therefore, a projection image of the projection apparatus 10 may exhibit a good optical effect.

Figure 4:
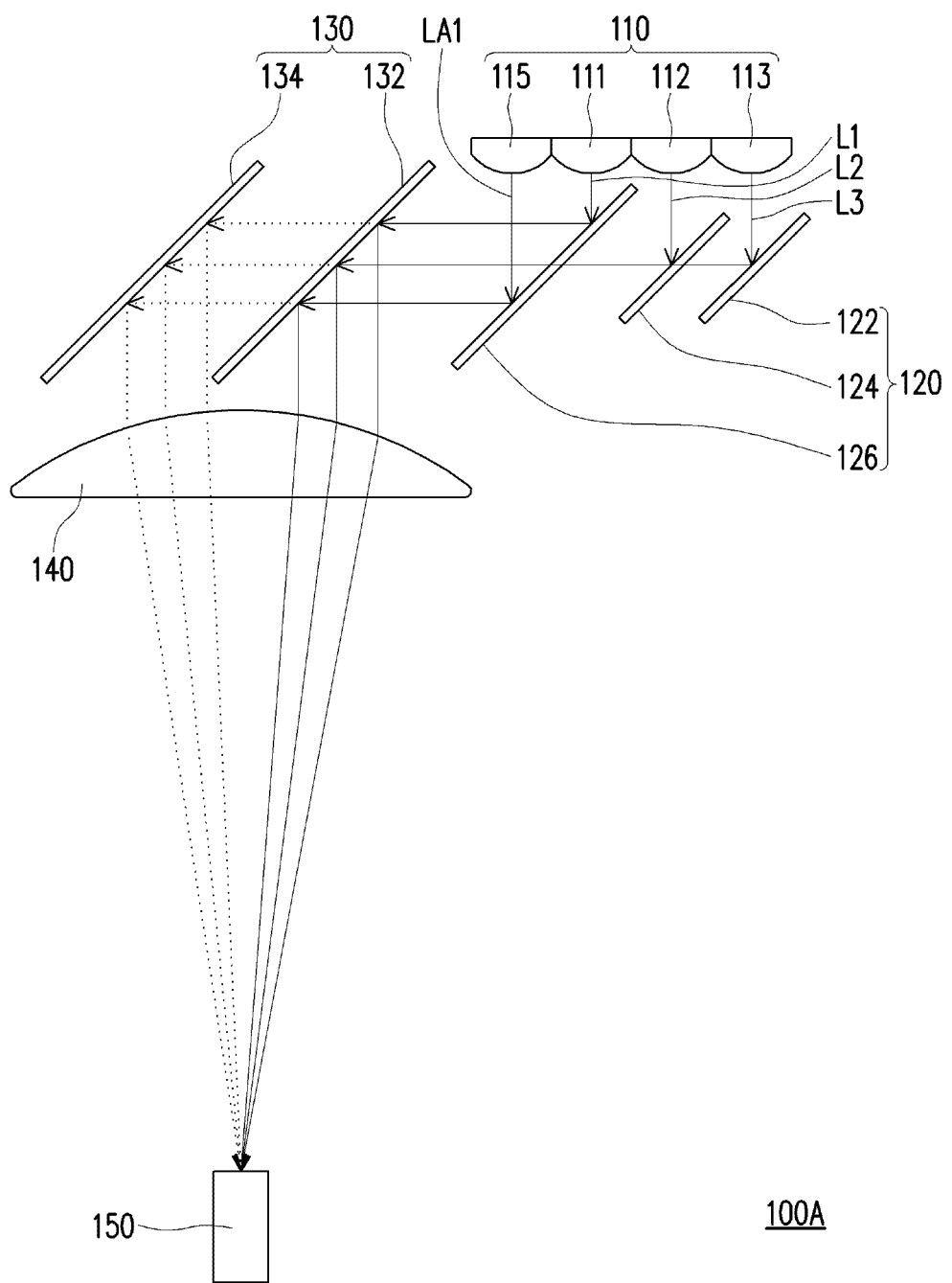
FIG. 4 is a schematic diagram of an illumination system according to another embodiment of the invention.

FIG. 4 is a schematic diagram of an illumination system according to another embodiment of the invention. Referring to FIG. 4, an illumination system 100A of the embodiment is similar to the illumination system 100 of FIG. 2, and a difference therebetween is that in the embodiment, a configuration of the first light source device 110 is an inverted configuration of the first light source device 110 of FIG. 2. As shown in FIG. 4, the first light source device 110 sequentially includes the third laser source 113, the second laser source 112, the first laser source 111 and the first compensation laser source 115 from right to left. The first half reflecting element 132 in the diachronic device 130 is configured to reflect a part of the second light beam L2 and a part of the third light beam L3 and is pervious to another part of the second light beam L2 and another part of the third light beam L3. The second reflecting element 134 is configured to reflect the first light beam L1, the second light beam L2, the third light beam L3, and the first compensation light beam LA1 passing through the first half reflecting element 132.

In other words, in the embodiment, the first reflecting element 122 is, for example, a mirror with green reflect (MG), the first light splitting element 124 is, for example, a dichroic mirror with blue reflect (DMB), and the second light splitting element 126 is, for example, a dichroic mirror with red reflect (DMR). Therefore, in the illumination system 100A of the embodiment, by configuring the different light guide device 120, a plurality of the light beams provided by the first light source device 110 may be transmitted to the light splitting device 130. In this way, uniformity of the light beam transmitted to the light uniforming element 150 may be improved, and a projection image of a projection apparatus using the illumination system 100A may exhibit a good optical effect.

Figure 5:
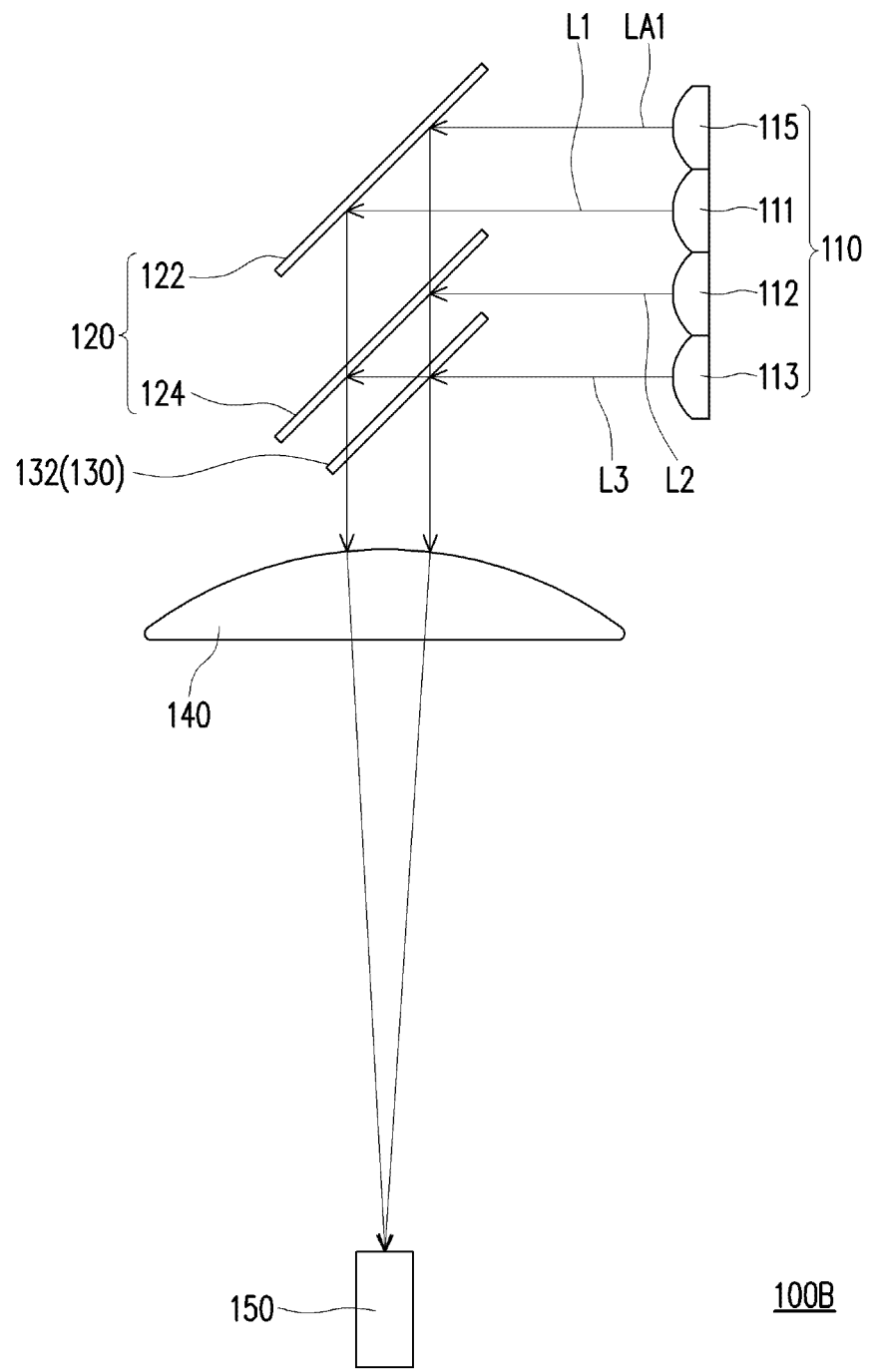
FIG. 5 is a schematic diagram of an illumination system according to another embodiment of the invention.

FIG. 5 is a schematic diagram of an illumination system according to another embodiment of the invention. Referring to FIG. 5, an illumination system 100B of the embodiment is similar to the illumination system 100 of FIG. 2, and a difference therebetween is that in the embodiment, the first light source device 110 is configured in a direction parallel to an optical axis of the light uniforming element 150. As shown in FIG. 5, the first light source device 110 sequentially includes the first compensation laser source 115, the first laser source 111, the second laser source 112, and the third laser source 113 from top to bottom. In other embodiments, positions of the first compensation laser source 115 and the first laser source 111 may be exchanged.

In the embodiment, the first light splitting element 124 of the light guide device 120 is configured to reflect the second light beam L2 and the third light beam L3, and is pervious to the first light beam L1 and the first compensation light beam LA1. In other words, in the embodiment, the first light splitting element 124 is, for example, a dichroic mirror with blue and green reflect (DMBG). In the embodiment, besides that the first half reflecting element 132 of the light splitting device 130 reflects a part of the second light beam L2 and a part of the third light beam L3 and is pervious to another part of the second light beam L2 and another part of the third light beam L3, the first half reflecting element 132 is also pervious to the first light beam L1 and the first compensation light beam LA1. In other words, in the embodiment, the first half reflecting element 132 is, for example, a half mirror with green and blue reflect (HMGB). In this way, uniformity of the light beam transmitted to the light uniforming element 150 may be improved, and a projection image of a projection apparatus using the illumination system 100B may have a good optical effect.

Figure 6A:
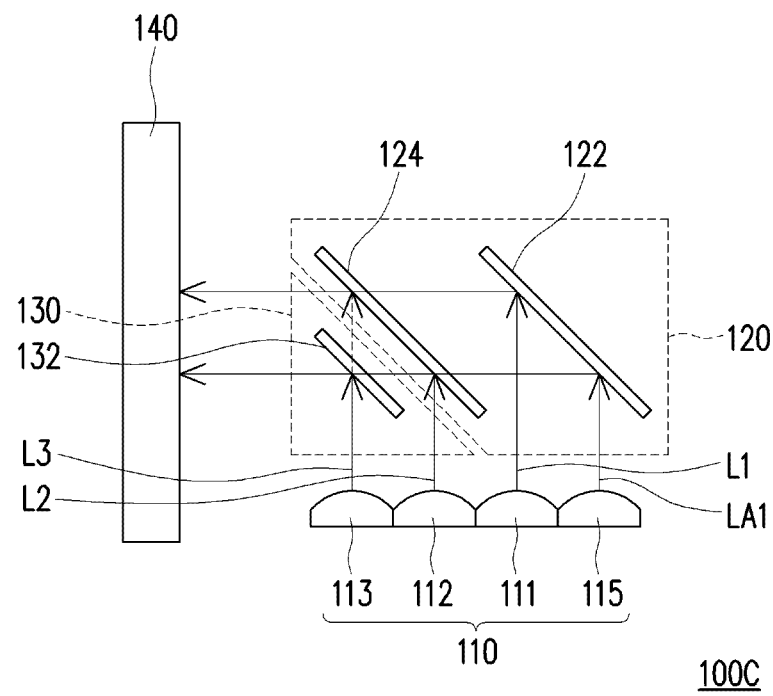
FIG. 6A to FIG. 6D are schematic diagrams of an illumination system showing different light beams according to another embodiment of the invention.
Figure 6B:
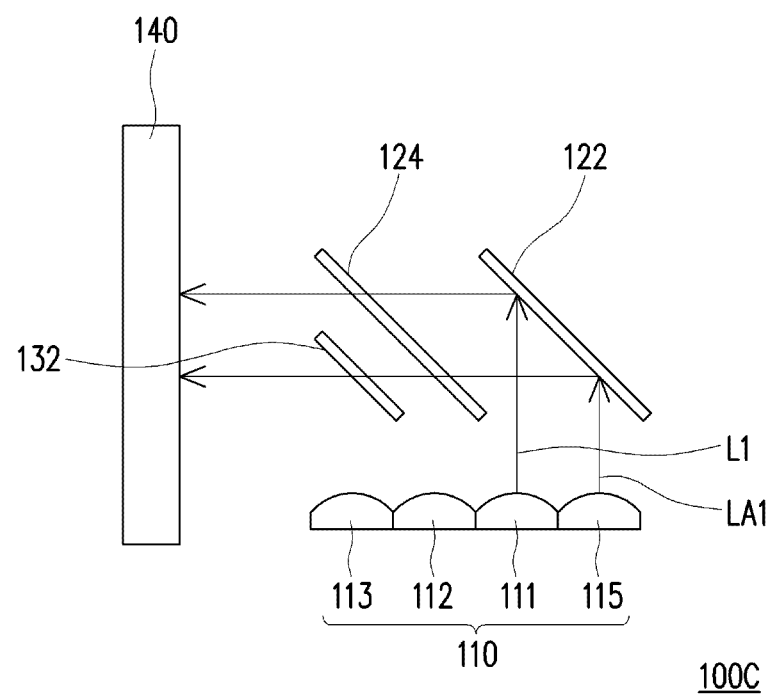
Figure 6C:
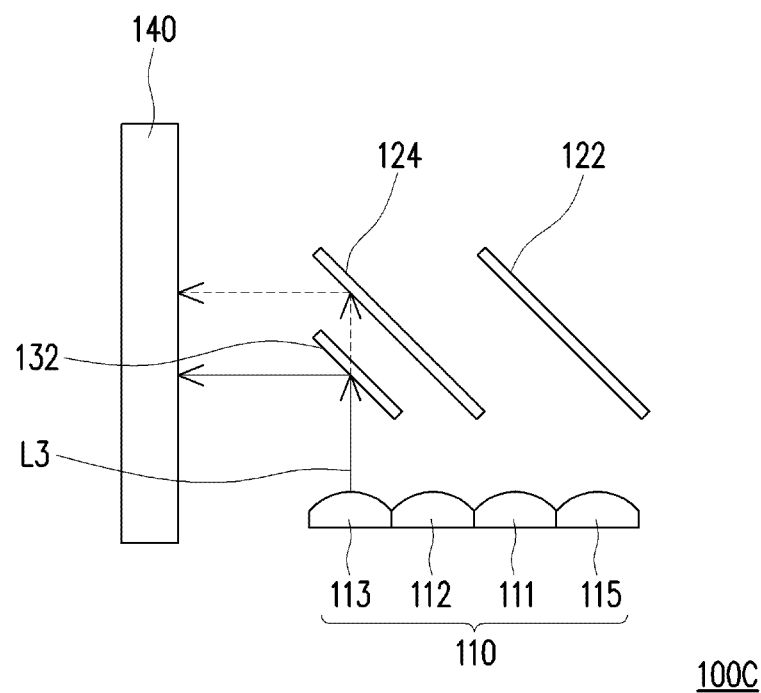
Figure 6D:
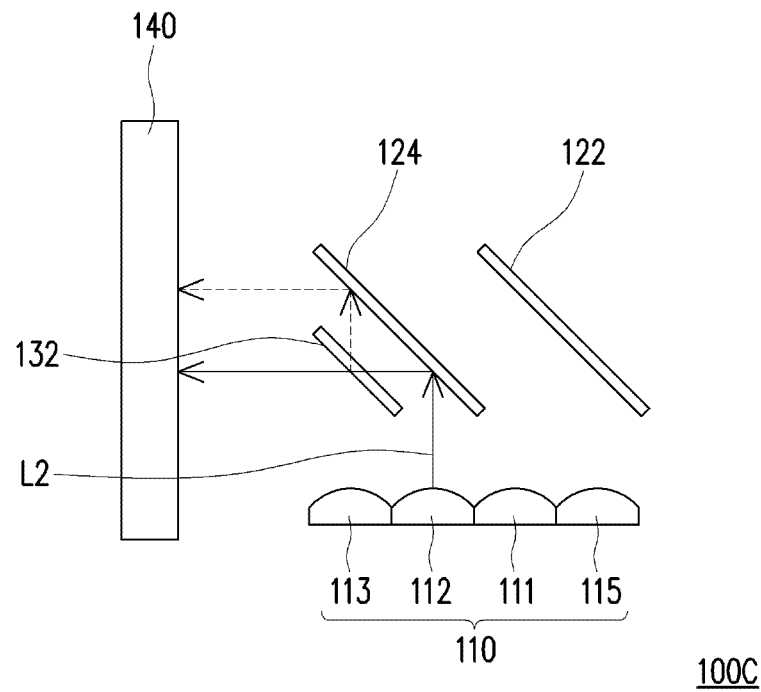

FIG. 6A to FIG. 6D are schematic diagrams of an illumination system showing different light beams according to another embodiment of the invention. Referring to FIG. 6A and FIG. 6D, an illumination system 100C of the embodiment is similar to the illumination system 100 of FIG. 2, and a difference therebetween is that in the embodiment, the first light splitting element 124 in the light guide device 120 is configured to reflect the second light beam L2 and the third light beam L3 and is pervious to the first light beam L1 and the first compensation light beam LA1. Moreover, the first half reflecting element 132 in the light splitting device 130 is configured to reflect a part of the second light beam L2 and a part of the third light beam L3 and is pervious to another part of the second light beam L2 and another part of the third light beam L3.

In other words, in the embodiment, the first light splitting element 124 is, for example, a dichroic mirror with blue and green reflect, and the first half reflecting element 132 is, for example, a half mirror with blue and green reflect. For clarity's sake, FIG. 6B only shows transmission paths of the first light beam L1 and the first compensation light beam LA1, FIG. 6C only shows a transmission path of the third light beam L3, and FIG. 6D only shows a transmission path of the second light beam L2. In this way, light beam uniformity is improved, and a projection image of a projection apparatus using the illumination system 100C may exhibit a good optical effect.

Figure 7A:
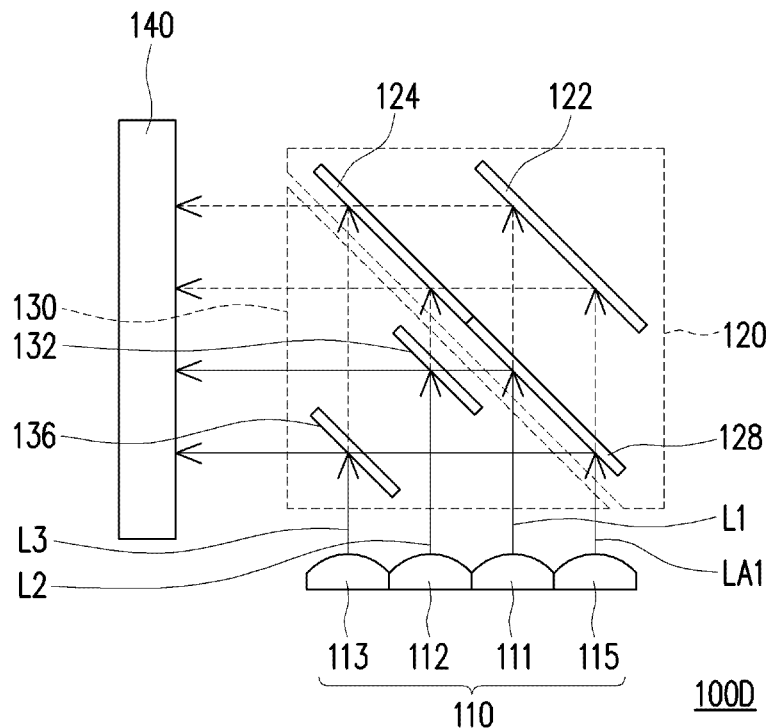
FIG. 7A to FIG. 7D are schematic diagrams of an illumination system showing different light beams according to another embodiment of the invention.
Figure 7B:
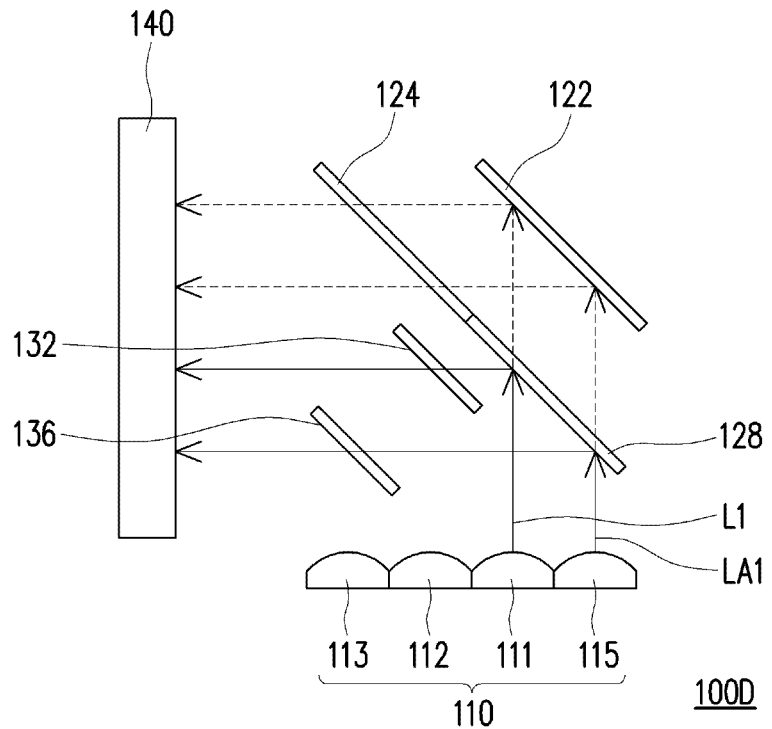
Figure 7C:
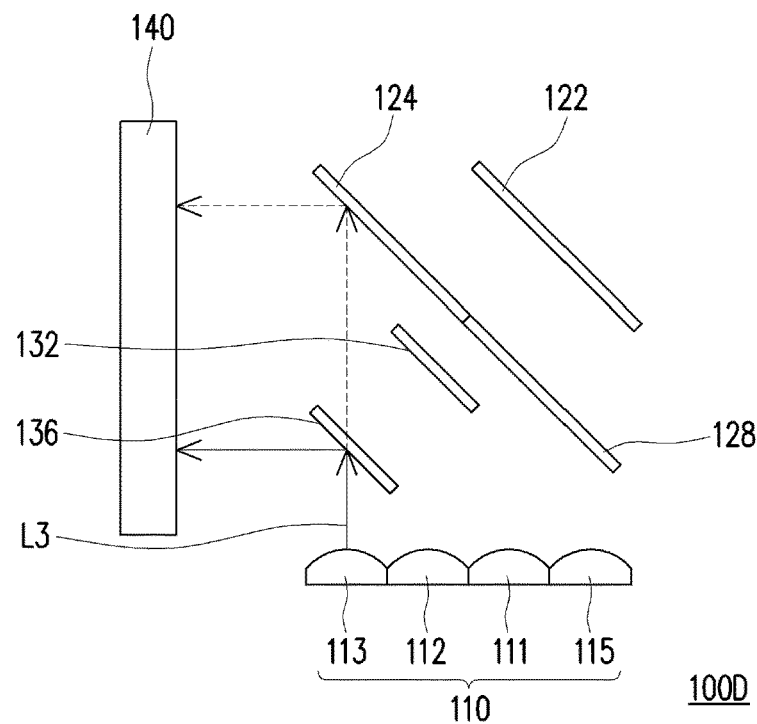
Figure 7D:
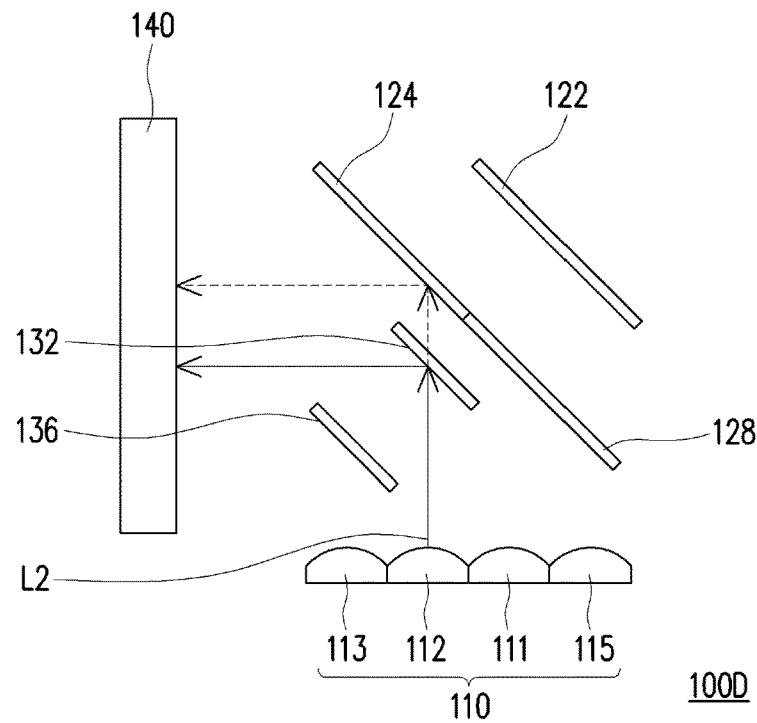

FIG. 7A to FIG. 7D are schematic diagrams of an illumination system showing different light beams according to another embodiment of the invention. Referring to FIG. 7A and FIG. 7D, an illumination system 100D of the embodiment is similar to the illumination system 100C of FIG. 6A, and a difference therebetween is that in the embodiment, the light guide device 120 further includes a second half reflecting element 128 for reflecting a part of the first light beam L1 and a part of the first compensation light beam LA1 and being pervious to another part of the first light beam L1 and another part of the first compensation light beam LA1. Moreover, the light splitting device 130 further includes a third half reflecting element 136, where the first half reflecting element 132 is configured to reflect a part of the second light beam L2 and is pervious to another part of the second light beam L2, and the third half reflecting element 136 is configured to reflect a part of the third light beam L3 and is pervious to another part of the third light beam L3.

In other words, in the embodiment, the first reflecting element 122 is, for example, a mirror, the first light splitting element 124 is, for example, a dichroic mirror with blue and green reflect, and the second half reflecting element 128 is, for example, a half mirror. The first light splitting element 124 and the second half reflecting element 128 are, for example, formed into a single optical element in a cemented manner, or the first light splitting element 124 and the second half reflecting element 128 are formed on a single optical element (for example, a glass sheet or a plastic sheet) in a coating manner, which is not limited by the invention.

The first half reflecting element 132 is, for example, a half mirror with blue reflect (HMB), and the third half reflecting element 136 is, for example, a half mirror with green reflect (HMG). For clarity's sake, FIG. 7B only shows transmission paths of the first light beam L1 and the first compensation light beam LA1, FIG. 7C only shows a transmission path of the third light beam L3, and FIG. 7D only shows a transmission path of the second light beam L2. In this way, light beam uniformity is improved, and a projection image of a projection apparatus using the illumination system 100D may have a good optical effect.

Figure 8A:
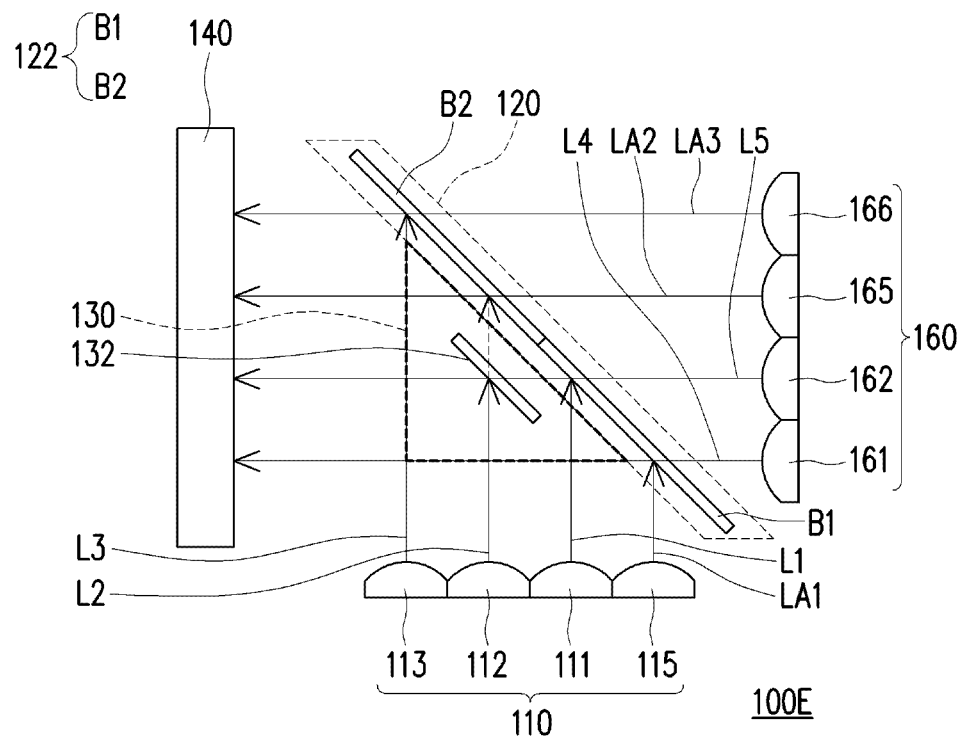
FIG. 8A to FIG. 8D are schematic diagrams of an illumination system showing different light beams according to another embodiment of the invention.
Figure 8B:
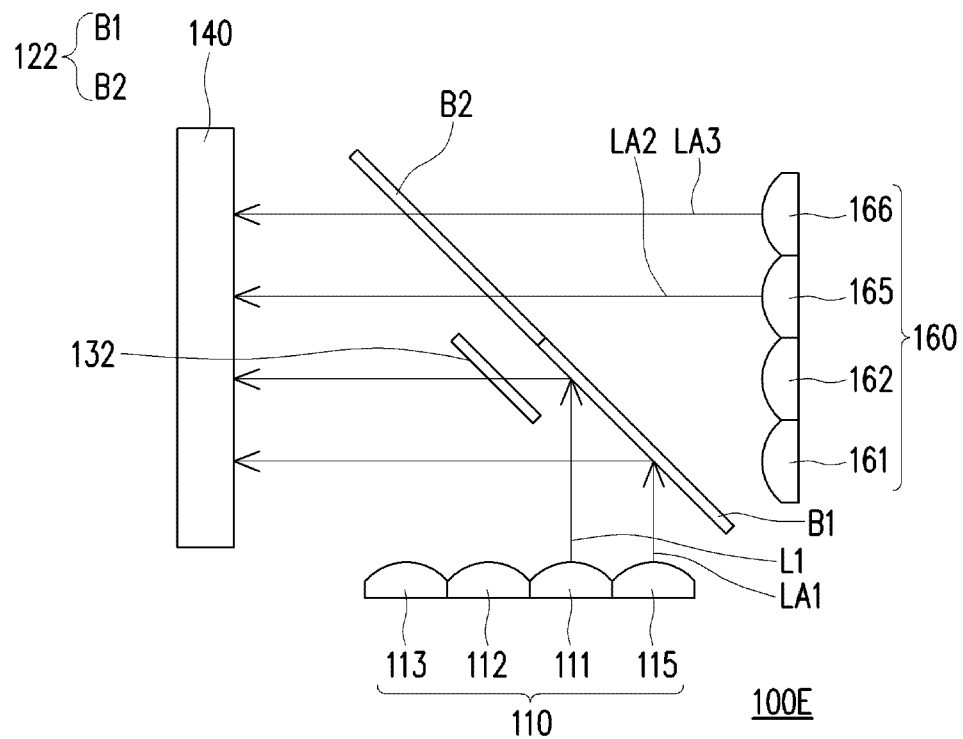
Figure 8C:
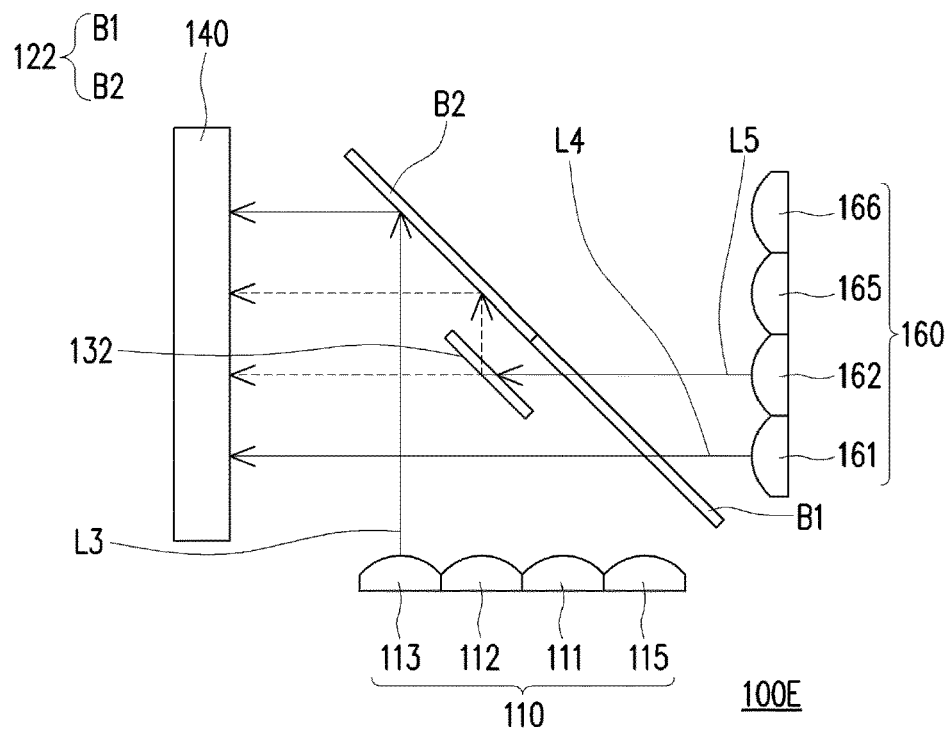
Figure 8D:
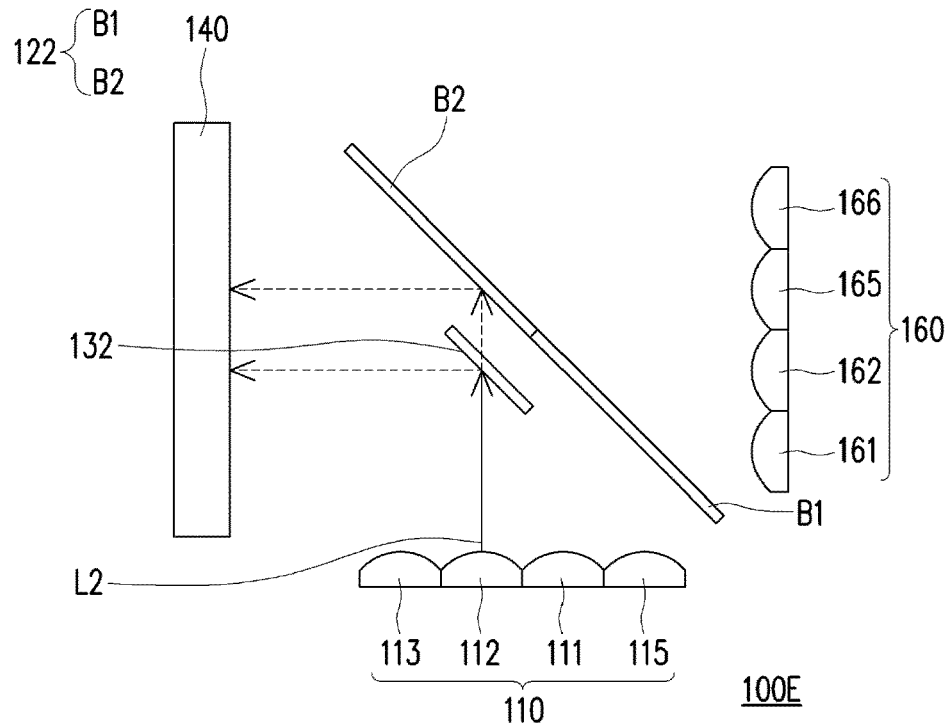

FIG. 8A to FIG. 8D are schematic diagrams of an illumination system showing different light beams according to another embodiment of the invention. Referring to FIG. 8A and FIG. 8D, an illumination system 100E of the embodiment is similar to the illumination system 100C of FIG. 6A, and a difference therebetween is that in the embodiment, the illumination system 100E further includes a second light source device 160 for providing a fourth light beam L4, a fifth light beam L5, a second compensation light beam LA2 and a third compensation light beam LA3. To be specific, in the embodiment, the second light source device 160 includes a fourth laser source 161, a fifth laser source 162, a second compensation laser source 165 and a third compensation laser source 166, where the fourth laser source 161 is configured to provide the fourth light beam L4, the fifth laser source 162 is configured to provide the fifth light beam L5, the second compensation laser source 165 is configured to provide the second compensation light beam LA2, and the third compensation laser source 166 is configured to provide the third compensation light beam LA3. In the embodiment, the fourth laser source 161 is a green laser diode, the fifth laser source 162 is a green laser diode, the second compensation laser source 165 is a red laser diode, and the third compensation laser source 166 is a red laser diode, but the invention is not limited thereto. Therefore, the fourth light beam L4, the fifth light beam L5, the second compensation light beam LA2 and the third compensation light beam LA3 are respectively green light, green light, red light and red light. In an embodiment, positions of the second compensation laser source 165 and the third compensation laser source 166 of the second light source device 160 may be exchanged, which is not limited by the invention.

In the embodiment, the first reflecting element 122 of the light guide device 120 includes a first portion B1 and a second portion B2, where the first portion B1 is configured to reflect the first light beam L1 and the first compensation light beam LA1, and is pervious to the fourth light beam L4 and the fifth light beam L5. The second portion B2 is configured to reflect the second light beam L2 and the third light beam L3, and is pervious to the second compensation light beam LA2 and the third compensation light beam LA3. Moreover, the first half reflecting element 132 in the light splitting device 130 further reflects a part of the second light beam L2, and is pervious to another part of the second light beam L2.

In other words, in the embodiment, the first portion B1 of the first reflecting element 122, for example, has a coating film with red reflect, and the second portion B2, for example, has a coating film with blue and green reflect. The first half reflecting element 132 is, for example, a half mirror with blue and green reflect. For simplicity's sake, FIG. 8B only shows transmission paths of the first light beam L1, the first compensation light beam LA1, the second compensation light beam LA2 and the third compensation light beam LA3, FIG. 8C only shows transmission paths of the third light beam L3, the fourth light beam L4 and the fifth light beam L5, and FIG. 8D only shows a transmission path of the second light beam L2. In this way, light beam uniformity is improved, and a projection image of a projection apparatus using the illumination system 100E may exhibit a good optical effect.

Figure 9A:
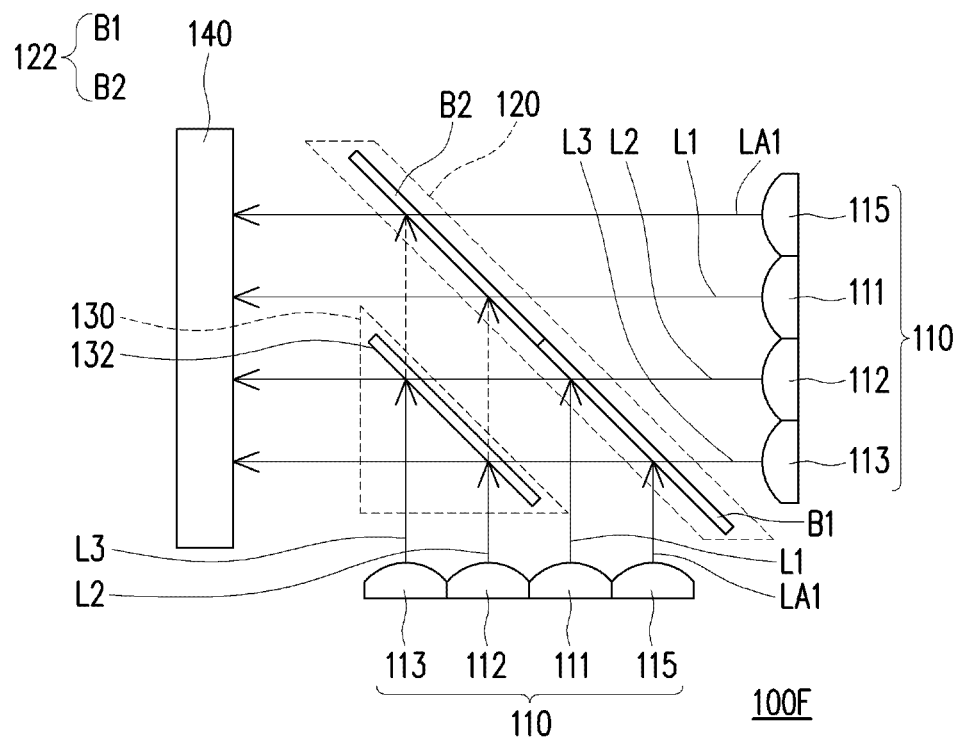
FIG. 9A to FIG. 9D are schematic diagrams of an illumination system showing different light beams according to another embodiment of the invention.
Figure 9B:
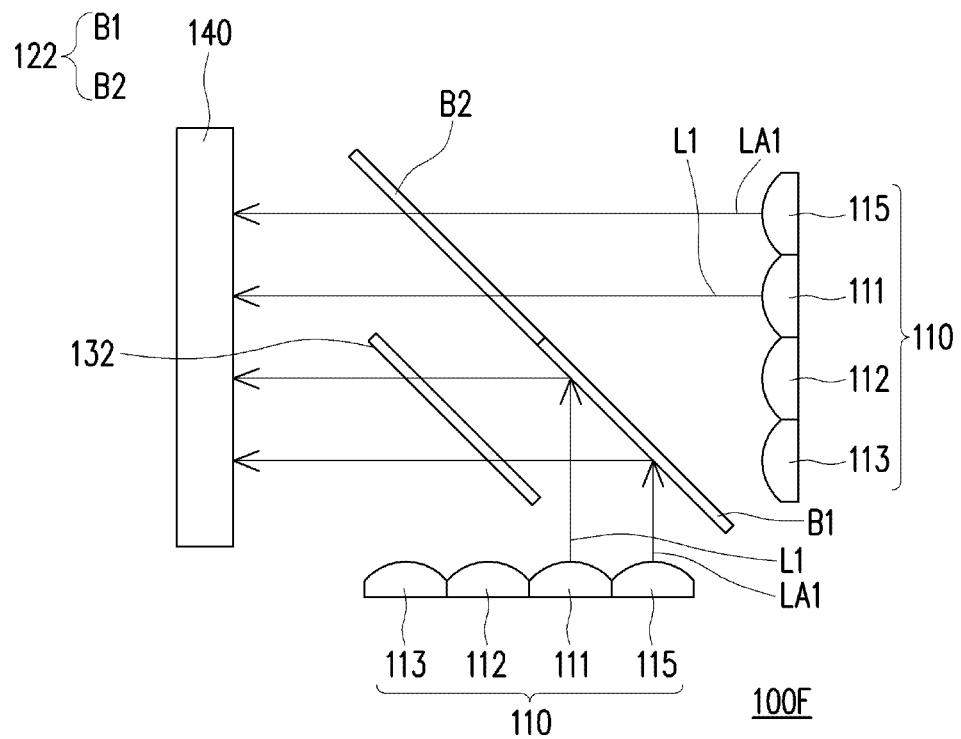
Figure 9C:
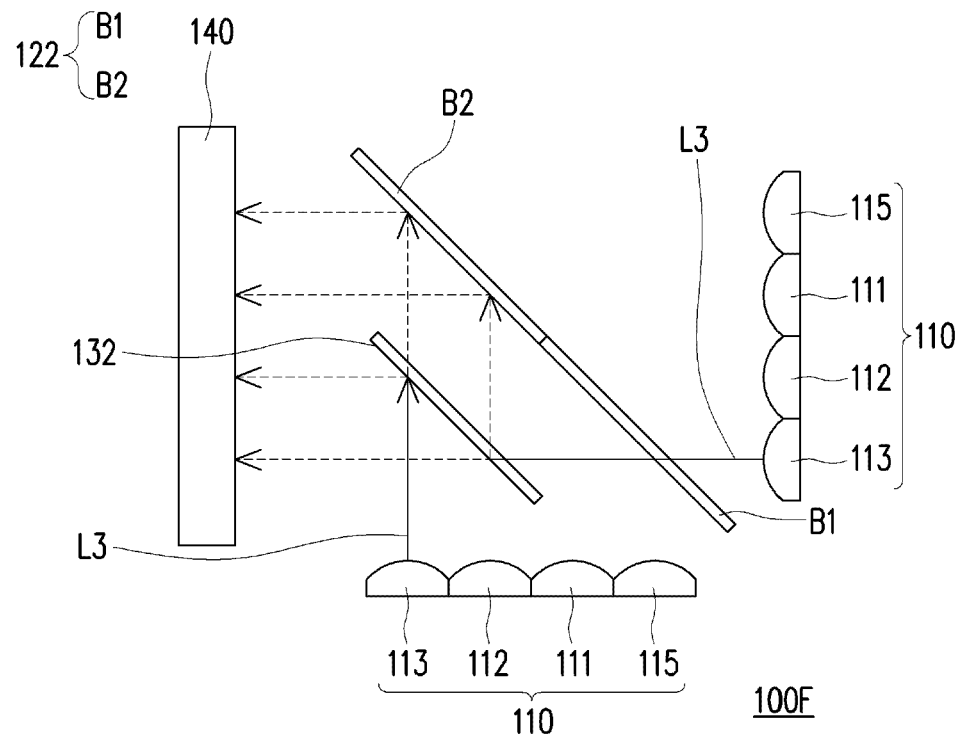
Figure 9D:
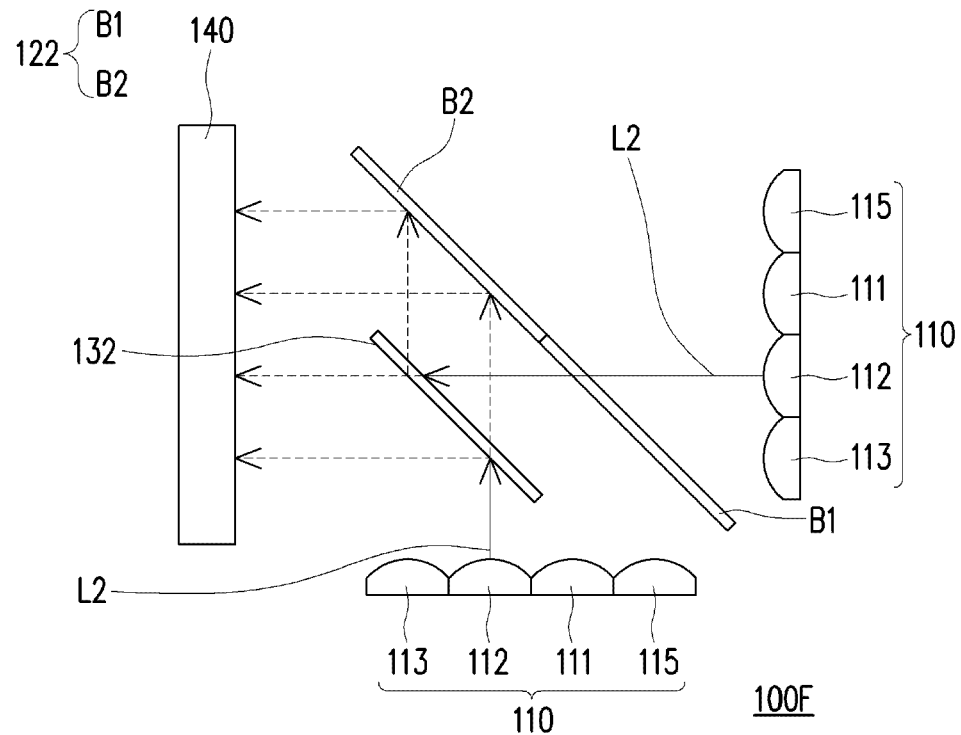

FIG. 9A to FIG. 9D are schematic diagrams of an illumination system showing different light beams according to another embodiment of the invention. Referring to FIG. 9A and FIG. 9D, an illumination system 100F of the embodiment is similar to the illumination system 100C of FIG. 6A, and a difference therebetween is that in the embodiment, a number of the first light source device 110 is two. The first reflecting element 122 of the light guide device 120 includes a first portion B1 and a second portion B2, where the first portion B1 is configured to reflect the first light beam L1 and the first compensation light beam LA1, and is pervious to the second light beam L2 and the third light beam L3. The second portion B2 is configured to reflect the second light beam L2 and the third light beam L3, and is pervious to the first light beam L1 and the first compensation light beam LA1. Moreover, the first half reflecting element 132 in the light splitting device 130 further reflects a part of the second light beam L2 and a part of the third light beam L3, and is pervious to another part of the second light beam L2 and another part of the third light beam L3. In the embodiment, positions of the first laser source 111 and the first compensation laser source 115 in each of the first light source devices 110 may be exchanged, but the invention is not limited thereto.

In other words, in the embodiment, the first portion B1 of the first reflecting element 122, for example, has a coating film with red reflect, and the second portion B2, for example, has a coating film with blue and green reflect. The first half reflecting element 132 is, for example, a half mirror with blue and green reflect. For simplicity's sake, FIG. 9B only shows transmission paths of the first light beam L1 and the first compensation light beam LA1, FIG. 9C only shows a transmission path of the third light beam L3, and FIG. 9D only shows a transmission path of the second light beam L2. In this way, light beam uniformity is improved, and a projection image of a projection apparatus using the illumination system 100F may exhibit a good optical effect.

Figure 10:
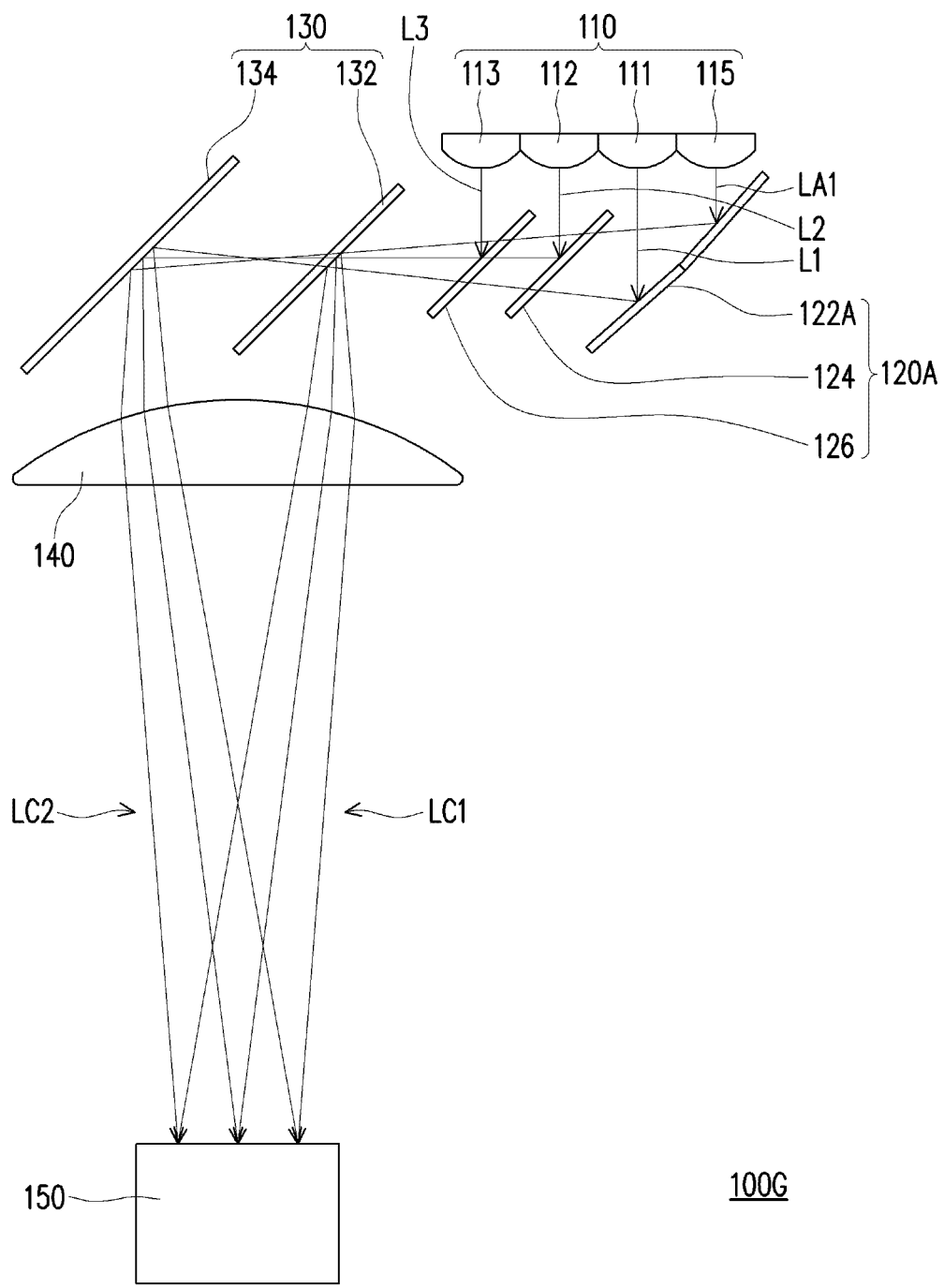
FIG. 10 is a schematic diagram of an illumination system according to another embodiment of the invention.

FIG. 10 is a schematic diagram of an illumination system according to another embodiment of the invention. Referring to FIG. 10, an illumination system 100G of the embodiment is similar to the illumination system 100 of FIG. 2, and a difference therebetween is that in the embodiment, the first reflecting element 122A in the light guide device 120A is a curved mirror. To be specific, the first reflecting element 122A is, for example, spliced by two mirrors in a non-parallel manner to reflect the first light beam L1 and the first compensation light beam LA1 toward a same direction in the non-parallel manner, as shown in FIG. 10. Therefore, the first combined light beam LC1 and the second combined light beam LC2 may be transmitted to the light uniforming element 150 in a divergent manner. In this way, uniformity of the light beam transmitted to the light uniforming element 150 may be further improved, and a projection image of a projection apparatus using the illumination system 100G may exhibit a good optical effect.

Figure 11:
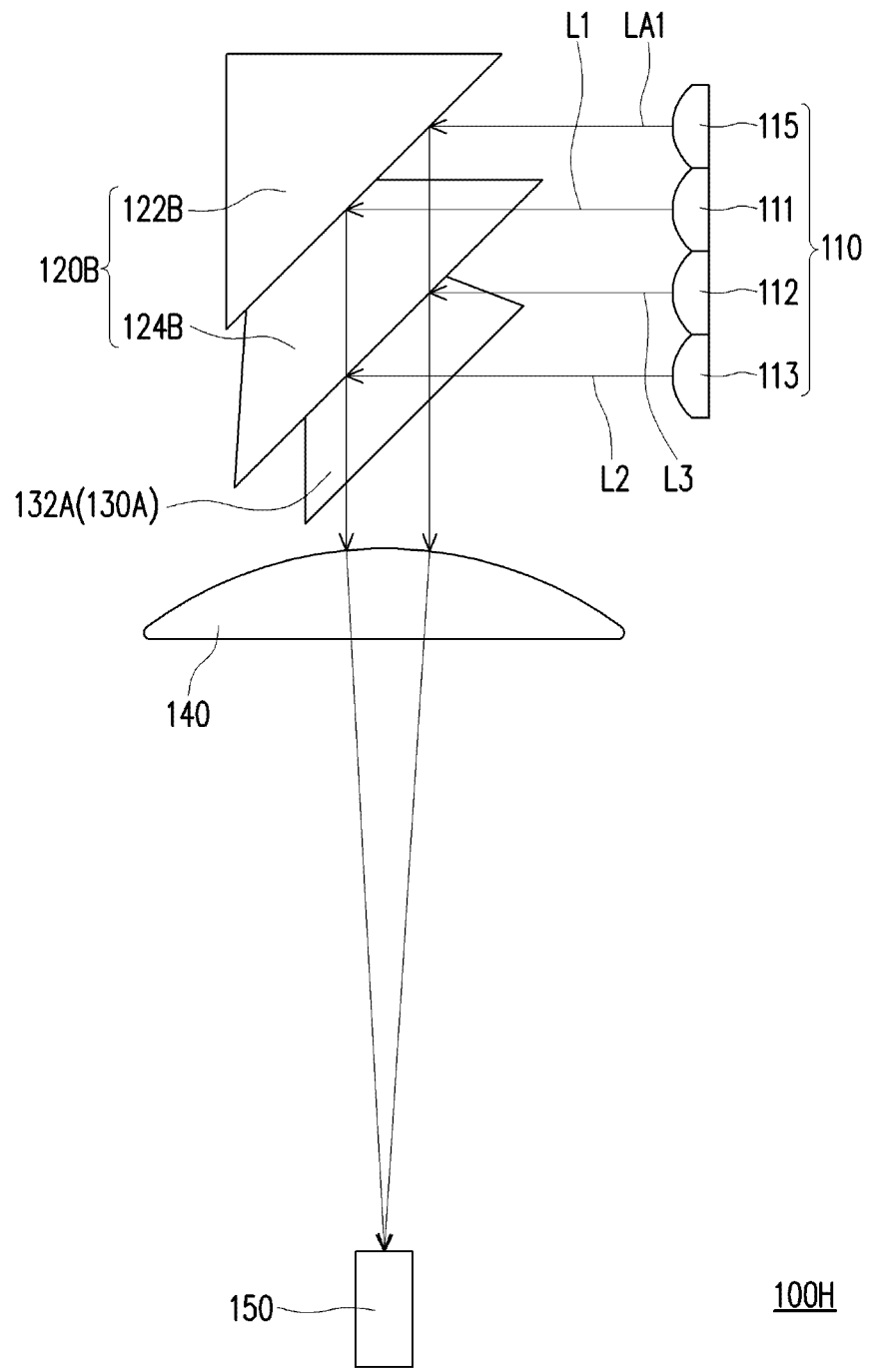
FIG. 11 is a schematic diagram of an illumination system according to another embodiment of the invention.

FIG. 11 is a schematic diagram of an illumination system according to another embodiment of the invention. An illumination system 100H of the embodiment is similar to the illumination system 100B of FIG. 5, and a difference therebetween is that in the embodiment, a light guide device 120B and a light splitting device 130A are composed of prisms with reflective coating films. In detail, a first reflecting element 122B in the light guide device 120B is, for example, a prism with a reflective coating film. A first light splitting element 124B is, for example, a prism with a coating film with blue and green reflect. A first half reflecting element 132A is, for example, a prism with a coating film with blue and green reflect. Therefore, the light guide device 120B and the light splitting device 130A have a simple assembling mode, and uniformity of the light beam transmitted to the light uniforming element 150 is further improved, and a projection image of a projection apparatus using the illumination system 100H may exhibit a good optical effect.

In summary, the embodiments of the invention have at least one of following advantages or effects. In the illumination system and the projection apparatus of the invention, the plurality of light beams provided by the first light source device are transmitted to the light splitting device through configuration of different optical elements in the light guide device, and the light beams pass through the light splitting device to generate the first combined light beam and the second combined light beam. Moreover, the distances between the light spots formed on the light converging element by the first combined light beam and the second combined light beam and the central axis of the light converging element are both identical and greater than zero. In this way, uniformity of the light beam transmitted to a light uniforming element is improved, such that a projection image of the projection apparatus exhibits a good optical effect.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An illumination system, comprising a first light source device, a light guide device, a light splitting device, and a light converging element, wherein
the first light source device comprises laser sources configured to provide a first light beam, a second light beam, a third light beam, and a first compensation light beam;
the light guide device is configured to reflect the first light beam, the second light beam, the third light beam, and the first compensation light beam;
the light splitting device comprises a first half reflecting element, wherein the first half reflecting element is configured to reflect a part of a light beam and is configured to allow another part of the light beam to pass through, wherein the light beam comprises at least one of the first light beam, the second light beam, the third light beam, and the first compensation light beam;
the light converging element is configured to receive a first combined light beam and a second combined light beam formed by the first light beam, the second light beam, the third light beam, and the first compensation light beam, wherein distances between light spots formed on the light converging element by the first combined light beam and the second combined light beam and a central axis of the light converging element are both identical and greater than zero.

2. The illumination system according to claim 1, further comprising a light uniforming element disposed on transmission paths of the first combined light beam and the second combined light beam, and the light uniforming element is configured to convert the first combined light beam and the second combined light beam into an illumination light beam.

3. The illumination system according to claim 1, wherein the light guide device comprises a first reflecting element configured to reflect the first light beam and the first compensation light beam.

4. The illumination system according to claim 3, wherein the light guide device further comprises a first light splitting element and a second light splitting element, the first light splitting element is configured to reflect the second light beam and is configured to allow the first light beam and the first compensation light beam to pass through, and the second light splitting element is configured to reflect the third light beam and is configured to allow the first light beam, the first compensation light beam, and the second light beam to pass through.

5. The illumination system according to claim 3, wherein the light guide device further comprises a first light splitting element configured to reflect the second light beam and the third light beam and configured to allow the first light beam and the first compensation light beam to pass through.

6. The illumination system according to claim 5, wherein the light guide device further comprises a second half reflecting element configured to reflect a part of the first light beam and a part of the first compensation light beam and configured to allow another part of the first light beam and another part of the first compensation light beam to pass through.

7. The illumination system according to claim 1, wherein the light guide device comprises a first reflecting element, a first light splitting element, and a second light splitting element, the first reflecting element is configured to reflect the third light beam, the first light splitting element is configured to reflect the second light beam and is configured to allow the third light beam to pass through, and the second light splitting element is configured to reflect the first light beam and the first compensation light beam and is configured to allow the second light beam and the third light beam to pass through.

8. The illumination system according to claim 1, wherein the first half reflecting element is further configured to reflect a part of the first light beam and a part of the first compensation light beam and is configured to allow another part of the first light beam and another part of the first compensation light beam to pass through.

9. The illumination system according to claim 1, wherein the first half reflecting element is further configured to allow the first light beam and the first compensation light beam to pass through.

10. The illumination system according to claim 1, wherein the light splitting device further comprises a second reflecting element, and the first half reflecting element is disposed between the light guide device and the second reflecting element.

11. The illumination system according to claim 1, wherein the light splitting device further comprises a third half reflecting element, the first half reflecting element is configured to reflect a part of the second light beam and is configured to allow another part of the second light beam to pass through, and the third half reflecting element is configured to reflect a part of the third light beam and is configured to allow another part of the third light beam to pass through.

12. The illumination system according to claim 1, further comprising a second light source device, wherein the second light source device is configured to provide a fourth light beam, a fifth light beam, a second compensation light beam, and a third compensation light beam, the light guide device comprises a first reflecting element, and the first reflecting element comprises a first portion and a second portion, wherein the first portion is configured to reflect the first light beam and the first compensation light beam and is configured to allow the fifth light beam and the third compensation light beam to pass through, and the second portion is configured to reflect the second light beam, the third light beam, and the third compensation light beam and is configured to allow the fourth light beam and the second compensation light beam to pass through.

13. The illumination system according to claim 1, wherein a number of the first light source device is two, the light guide device comprises a first reflecting element, and the first reflecting element comprises a first portion and a second portion, wherein the first portion is configured to reflect the first light beam and the first compensation light beam and is configured to allow the second light beam and the third light beam to pass through, and the second portion is configured to reflect the second light beam and the third light beam and is configured to allow the first light beam and the first compensation light beam to pass through.

14. A projection apparatus, comprising an illumination system, at least one light valve, and a projection lens, wherein
the illumination system is configured to provide an illumination light beam, the illumination system comprises a first light source device, a light guide device, a light splitting device, and a light converging element, wherein
the first light source device is comprises laser sources configured to provide a first light beam, a second light beam, a third light beam, and a first compensation light beam,
the light guide device is configured to reflect the first light beam, the second light beam, the third light beam, and the first compensation light beam to the light splitting device or the light converging element,
the light splitting device comprises a first half reflecting element configured to reflect a part of a light beam and configured to allow another part of the light beam to pass through, wherein the light beam comprises at least one of the first light beam, the second light beam, the third light beam, and the first compensation light beam, and
the light converging element is configured to receive a first combined light beam and a second combined light beam formed by the first light beam, the second light beam, the third light beam, and the first compensation light beam, wherein distances between light spots formed on the light converging element by the first combined light beam and the second combined light beam and a central axis of the light converging element are both identical and greater than zero,
the at least one light valve is disposed on a transmission path of the illumination light beam and is configured to convert the illumination light beam into an image light beam, and
the projection lens is disposed on a transmission path of the image light beam and is configured to project the image light beam out of the projection apparatus.

15. The projection apparatus according to claim 14, wherein the illumination system further comprises a light uniforming element, the light uniforming element is disposed on transmission paths of the first combined light beam and the second combined light beam and is configured to convert the first combined light beam and the second combined light beam into the illumination light beam.

16. The projection apparatus according to claim 14, wherein the light guide device comprises a first reflecting element configured to reflect the first light beam and the first compensation light beam.

17. The projection apparatus according to claim 16, wherein the light guide device further comprises a first light splitting element and a second light splitting element, the first light splitting element is configured to reflect the second light beam and is configured to allow the first light beam and the first compensation light beam to pass through, and the second light splitting element is configured to reflect the third light beam and is configured to allow the first light beam, the first compensation light beam, and the second light beam to pass through.

18. The projection apparatus according to claim 16, wherein the light guide device further comprises a first light splitting element configured to reflect the second light beam and the third light beam and configured to allow the first light beam and the first compensation light beam to pass through.

19. The projection apparatus according to claim 18, wherein the light guide device further comprises a second half reflecting element configured to reflect a part of the first light beam and a part of the first compensation light beam and configured to allow another part of the first light beam and another part of the first compensation light beam to pass through.

20. The projection apparatus according to claim 14, wherein the light guide device comprises a first reflecting element, a first light splitting element, and a second light splitting element, the first reflecting element is configured to reflect the third light beam, the first light splitting element is configured to reflect the second light beam and is configured to allow the third light beam to pass through, and the second light splitting element is configured to reflect the first light beam and the first compensation light beam and is configured to allow the second light beam and the third light beam to pass through.

21. The projection apparatus according to claim 14, wherein the first half reflecting element is configured to reflect a part of the first light beam and a part of the first compensation light beam and is configured to allow another part of the first light beam and another part of the first compensation light beam to pass through.

22. The projection apparatus according to claim 14, wherein the first half reflecting element is further configured to allow the first light beam and the first compensation light beam to pass through.

23. The projection apparatus according to claim 14, wherein the light splitting device further comprises a second reflecting element, and the first half reflecting element is disposed between the light guide device and the second reflecting element.

24. The projection apparatus according to claim 14, wherein the light splitting device further comprises a third half reflecting element, the first half reflecting element is configured to reflect a part of the second light beam and is configured to allow another part of the second light beam to pass through, and the third half reflecting element is configured to reflect a part of the third light beam and is configured to allow another part of the third light beam to pass through.

25. The projection apparatus according to claim 14, wherein the illumination system further comprises a second light source device, the second light source device is configured to provide a fourth light beam, a fifth light beam, a second compensation light beam, and a third compensation light beam, the light guide device comprises a first reflecting element, and the first reflecting element comprises a first portion and a second portion, wherein the first portion is configured to reflect the first light beam and the first compensation light beam and is configured to allow the fifth light beam and the third compensation light beam to pass through, and the second portion is configured to reflect the second light beam, the third light beam, and the third compensation light beam and is configured to allow the fourth light beam and the second compensation light beam to pass through.

26. The projection apparatus according to claim 14, wherein a number of the first light source device is two, the light guide device comprises a first reflecting element, and the first reflecting element comprises a first portion and a second portion, wherein the first portion is configured to reflect the first light beam and the first compensation light beam and is configured to allow the second light beam and the third light beam to pass through, and the second portion is configured to reflect the second light beam and the third light beam and is configured to allow the first light beam and the first compensation light beam to pass through.

* * * * *